United States Patent
Zhang

(10) Patent No.: US 8,938,853 B2
(45) Date of Patent: Jan. 27, 2015

(54) HINGE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Peng Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/940,470

(22) Filed: Jul. 12, 2013

(65) Prior Publication Data

US 2014/0165335 A1 Jun. 19, 2014

(30) Foreign Application Priority Data

Dec. 19, 2012 (CN) .......................... 2012 1 05533959

(51) Int. Cl.
*E05D 11/00* (2006.01)
*G06F 1/16* (2006.01)

(52) U.S. Cl.
CPC ................................ *G06F 1/1681* (2013.01)
USPC ............................................ 16/250; 16/382

(58) Field of Classification Search
CPC ......... E05D 5/08; E05D 5/023; E05D 5/0276; E05D 11/0054; E05D 2700/04
USPC .................... 16/250, 355, 356, 382, 388, 392
See application file for complete search history.

(56) References Cited

U.S. PATENT DOCUMENTS

| 6,711,782 | B1 * | 3/2004 | Su ..................................... 16/342 |
| 6,748,625 | B2 * | 6/2004 | Lu ..................................... 16/285 |
| 7,513,012 | B2 * | 4/2009 | Chao ............................... 16/342 |
| 7,690,084 | B2 * | 4/2010 | Lu ..................................... 16/387 |
| 2011/0078876 | A1 * | 4/2011 | Choi ............................... 16/297 |
| 2011/0107556 | A1 * | 5/2011 | Wang et al. .................... 16/382 |
| 2011/0146028 | A1 * | 6/2011 | Lee ................................. 16/319 |

* cited by examiner

*Primary Examiner* — Roberta Delisle
(74) *Attorney, Agent, or Firm* — Novak Druce Connolly Bove + Quigg LLP

(57) ABSTRACT

A hinge includes a rotating member and a sleeve member. The rotating member includes a rotating shaft and a mounting portion connected to the rotating shaft. The mounting portion includes a first mounting portion. The first mounting portion includes a first mounting piece used to secure to an enclosure and a second mounting piece connected to the first mounting piece. The sleeve member includes a main body and a positioning portion extending from the main body. The rotating shaft is received in the sleeve member, and the second mounting piece is secured to the positioning portion.

18 Claims, 3 Drawing Sheets

HINGE

BACKGROUND

1. Technical Field

The present disclosure relates to hinges, more particularly to a hinge for an electronic device.

2. Description of Related Art

A hinge, such as a notebook, comprises a base and a cover rotatably secured to the base by a hinge. Generally, the hinge comprises a mounting portion and a rotating shaft connecting to the mounting portion. However, the rotating shaft is often exposed and it is easily damaged. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
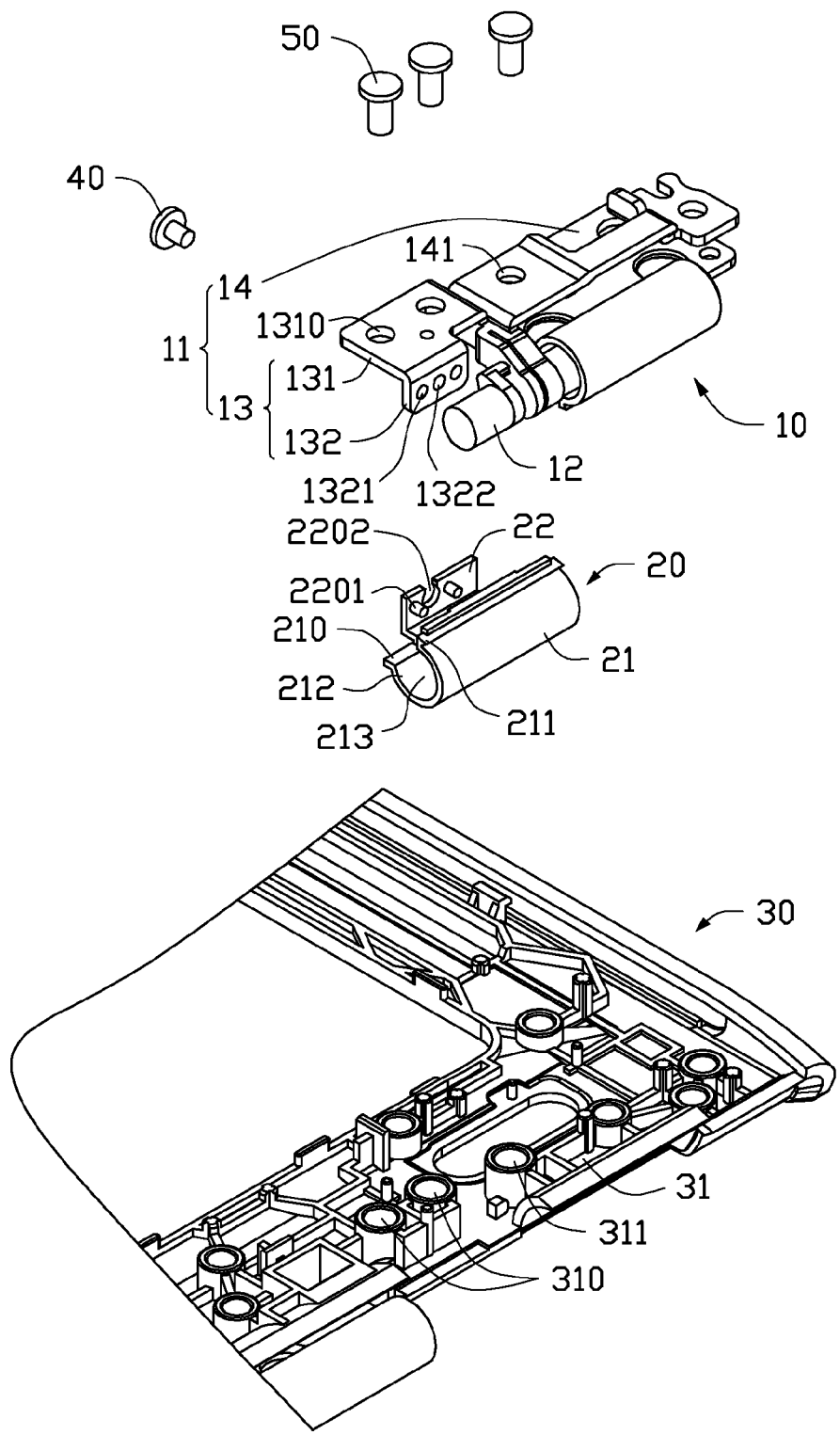
FIG. 1 is an exploded, cutaway view of a hinge and an enclosure in accordance with an embodiment.
Figure 2:
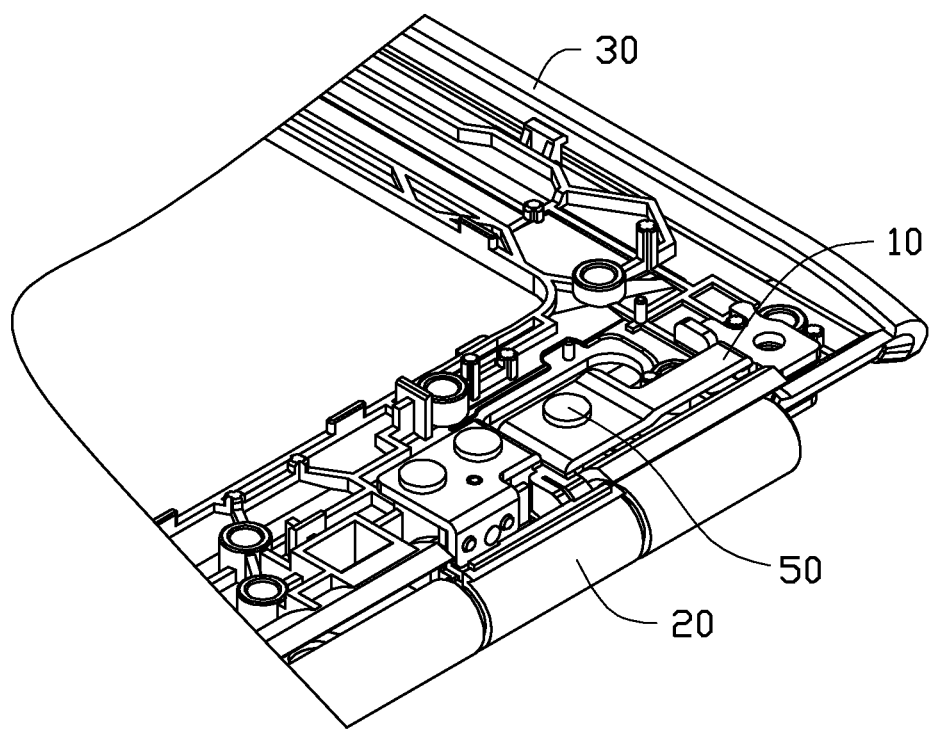
FIG. 2 is an assembled view of the hinge and the enclosure of FIG. 1.
Figure 3:
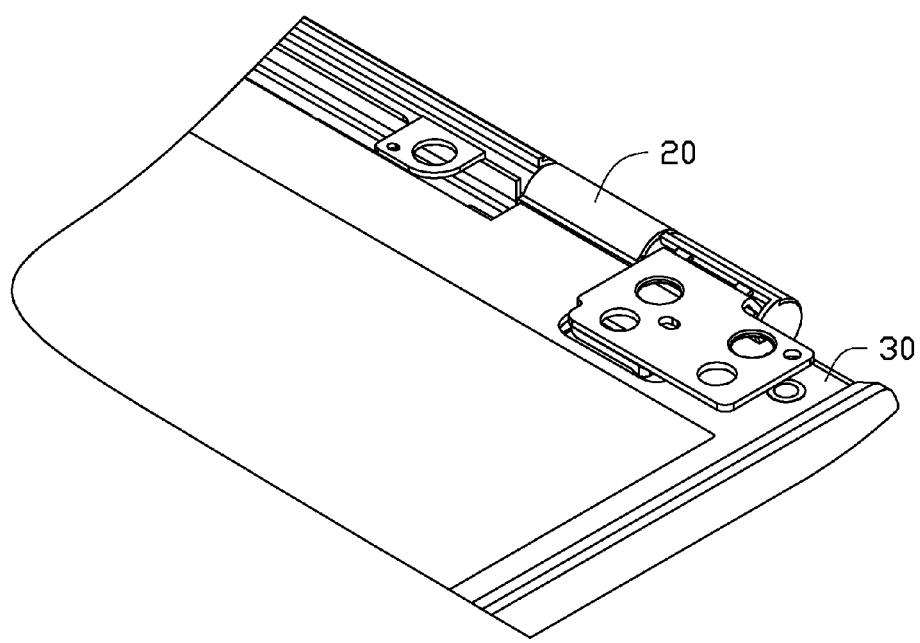
FIG. 3 is similar to FIG. 2, but viewed from a different aspect.

FIGS. 1-3 illustrate a hinge in accordance with an embodiment. The hinge comprises a rotating member 10 and a sleeve member 20 secured to the rotating member 10. The hinge can be secured to an enclosure 30. In one embodiment, the enclosure 30 is an enclosure of a notebook.

The rotating member 10 comprises a mounting portion 11 and a rotating shaft 12 rotatably connected to the mounting portion 11. The mounting portion 11 comprises a first mounting portion 13 and a second mounting portion 14 connected to the first mounting portion 13. The first mounting portion 13 comprises a first mounting piece 131 and a second mounting piece 132 connected to the first mounting piece 131. In one embodiment, the first mounting piece 131 is substantially perpendicular to the second mounting piece 132. Two mounting holes 1310 are defined in the first mounting piece 131. Two positioning holes 1321 and a securing hole 1322 are defined in the second mounting piece 132. The securing hole 1322 is located between the two positioning holes 1321. The second mounting portion 14 defines a fixing hole 141.

The sleeve member 20 comprises a main body 21 and a positioning portion 22 extending from the main body 21. In one embodiment, a cross-section of the main body 21 is substantially C-shaped. The main body 21 comprises a first flange 210 and a second flange 211, that is substantially parallel to the first flange 210. The positioning portion 22 extends from the first flange 210. A guiding opening 212 is defined by the first flange 210 and the second flange 211, and a receiving space 213, communicating with the cutout 211, is defined in the main body 21. The positioning portion 22 comprises two positioning posts 2201. A receiving hole 2202, such as a cutout, is defined in the positioning portion 22 and located between the two positioning posts 2201. In one embodiment, the positioning portion 22 is substantially parallel to the second mounting piece 132.

The enclosure 30 comprises a base 31. Two first fastening holes 310 and a second fastening hole 311 are defined in the base 31. The two first fastening holes 310 correspond to the two mounting holes 1310, and the second fastening hole 311 corresponds to the fixing hole 141.

FIGS. 1-3 show that in assembly, the sleeve member 20 is located below the rotating member 10. The positioning portion 22 is located between the second mounting piece 132 and the rotating shaft 12. The two positioning posts 2201 are aligned with the two positioning holes 1321, and the rotating shaft 12 is aligned with the guiding opening 212. The sleeve member 20 is moved towards the second mounting piece 132, and the two positioning posts 2201 are received in the two positioning holes 1321. The rotating shaft 12 extends through the guiding opening 212 and urges the first flange 210 and the second flange 211 to be deformed in opposite directions. When the rotating shaft 12 is received in the receiving space 213, the first flange 210 and the second flange 211 are released back to prevent the rotating shaft 12 from disengaging from the receiving space 213. Thus, the sleeve 20 is secured to the rotating shaft 12. The securing hole 1322 is aligned with the receiving hole 2202. A mounting member 40, such as a screw, is received in the securing holes 1322 and the receiving hole 2202, to secure the positioning portion 22 to the second mounting piece 132.

The rotating member 10 with the sleeve member 20 is attached to the base 31.

The two mounting holes 1310 are aligned with the two first fastening holes 310, and the fixing hole 141 is aligned with the second fastening hole 311. Three fixing members 50, such as screws, are engaged in the two mounting holes 1310 and the two first fastening holes 310, and engaged in the fixing hole 141 and the second fastening hole 311. Thus, the hinge, comprising the rotating member 10 and the sleeve member 20, is secured to the enclosure 30.

In disassembly, the fixing members 50 is removed from the two mounting holes 1310 and the two first fastening holes 310, and also removed from the fixing hole 141 and the second fastening hole 311. The hinge is detached from the base 31. The mounting member 40 is removed from the securing hole 1322 and the receiving hole 2202, and the two positioning posts 2201 are disengaged from the two positioning holes 1321. Thus, the sleeve member 20 can be detached from the rotating member 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A hinge comprising:
a rotating member comprising a rotating shaft and a mounting portion; the mounting portion comprises a first mounting portion; the first mounting portion comprises a first mounting piece and a second mounting piece; and
a sleeve member comprising a main body and a positioning portion; the main body defining a receiving space, the main body comprising a first flange and a second flange, the first flange and the second flange extending from the receiving space and cooperatively defining a guiding opening;

wherein the rotating member is rotatable about the rotating shaft, and the first mounting piece is configured to secure to an enclosure; and the rotating shaft extends through the guiding opening to be received in the receiving space, and the second mounting piece is secured to the positioning portion.

2. The hinge of claim 1, wherein the first mounting piece is substantially perpendicular to the second mounting piece.

3. The hinge of claim 1, wherein the second mounting piece defines a securing hole, the positioning portion defines a receiving hole, and a mounting member is received in the securing hole and the receiving hole.

4. The hinge of claim 1, wherein the positioning portion is substantially parallel to the second mounting piece.

5. The hinge of claim 1, wherein the second mounting piece defines a positioning hole, and the positioning portion comprises a positioning post engaged in the positioning hole.

6. The hinge of claim 1, wherein the second flange is substantially parallel to the first flange.

7. The hinge of claim 1, wherein a cross section of the sleeve member is substantially C-shaped.

8. The hinge of claim 1, wherein the positioning portion is located between the second mounting piece and the rotating shaft.

9. The hinge of claim 1, wherein the rotating member further comprises a second mounting portion configured to secure to the enclosure, and the second mounting portion is connected to the first mounting portion.

10. A hinge comprising:

a rotating member comprising a rotating shaft and a mounting portion connected to the rotating shaft; the mounting portion comprises a first mounting portion; the first mounting portion comprises a first mounting piece and a second mounting piece extending from the first mounting piece; and a sleeve member comprising a main body and a positioning portion extending from the main body; the main body comprises a first flange and a second flange substantially parallel to the first flange;

wherein the rotating member is rotatable about the rotating shaft, the first mounting piece is configured to secure to an enclosure; and the first flange and the second flange are deformable in opposite directions to engage the rotating shaft in the sleeve member, and the second mounting piece is secured to the positioning portion.

11. The hinge of claim 10, wherein the first mounting piece is substantially perpendicular to the second mounting piece.

12. The hinge of claim 10, wherein the second mounting piece defines a securing hole, the positioning portion defines a receiving hole, and a mounting member is received in securing hole and the receiving hole.

13. The hinge of claim 10, wherein the positioning portion is substantially parallel to the second mounting piece.

14. The hinge of claim 10, wherein the second mounting piece defines a positioning hole, and the positioning portion comprises a positioning post engaged in the positioning hole.

15. The hinge of claim 10, wherein the first flange and the second flange cooperatively defines a guiding opening, a receiving space is defined in the sleeve member and communicates with the guiding opening, and the rotating shaft is received in the receiving space via the guiding opening.

16. The hinge of claim 10, wherein a cross-section of the sleeve member is substantially C-shaped.

17. The hinge of claim 10, wherein the positioning portion is located between the second mounting piece and the rotating shaft.

18. The hinge of claim 10, wherein the rotating member further comprises a second mounting portion configured to secure to the enclosure, and the second mounting portion is connected to the first mounting portion.

* * * * *